United States Patent Office 3,490,977
Patented Jan. 20, 1970

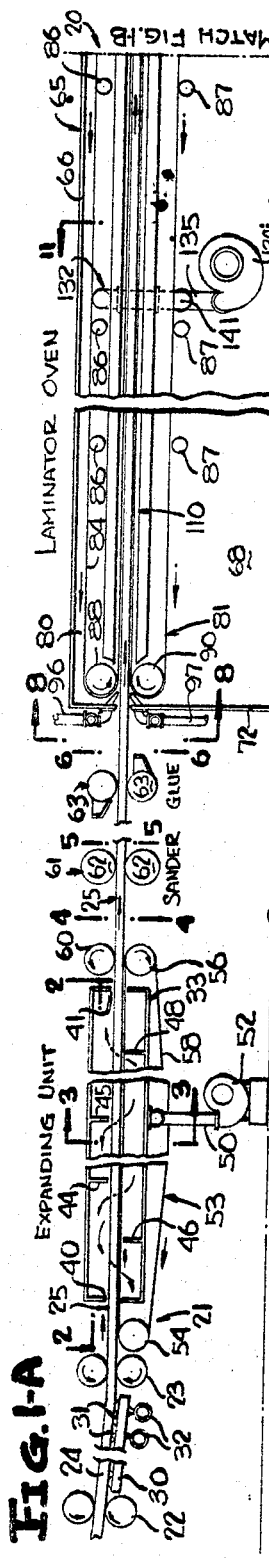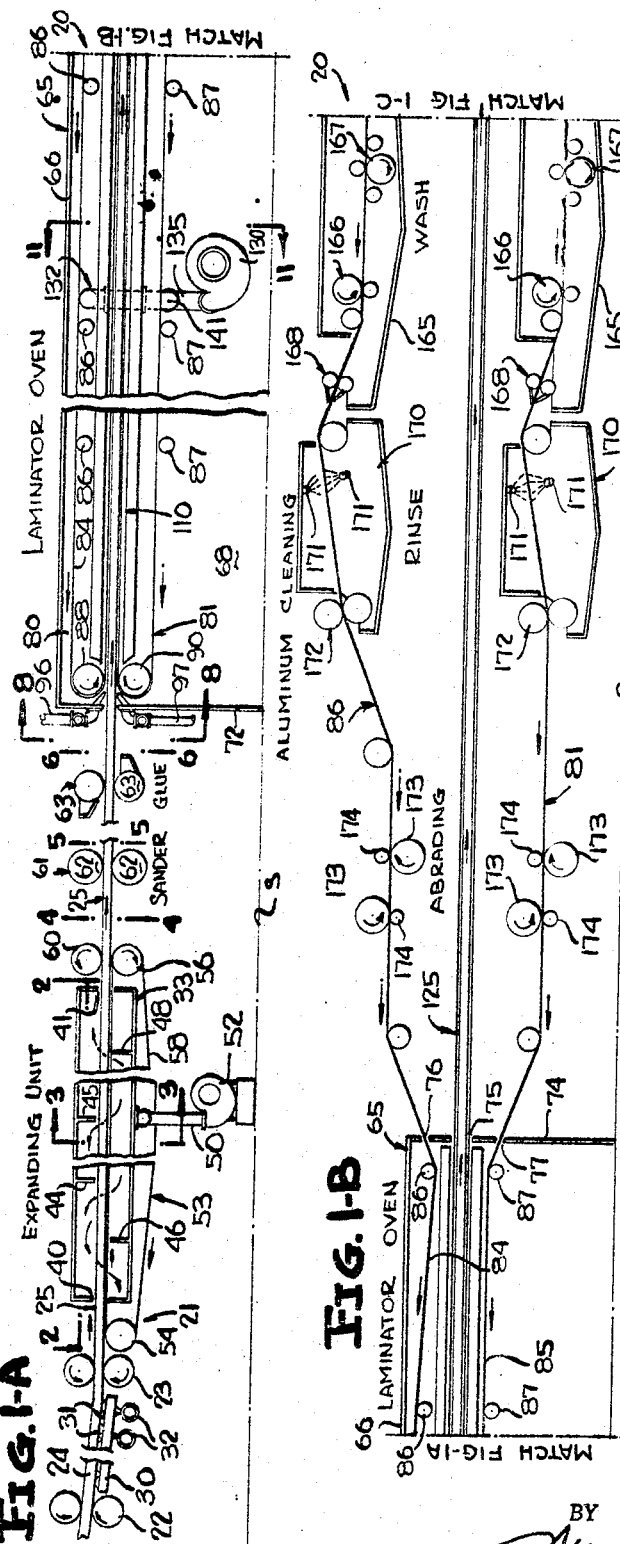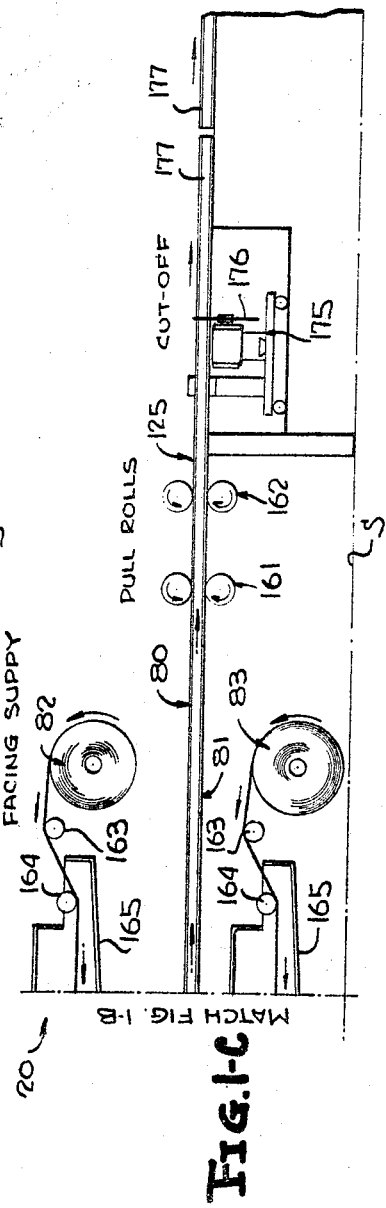

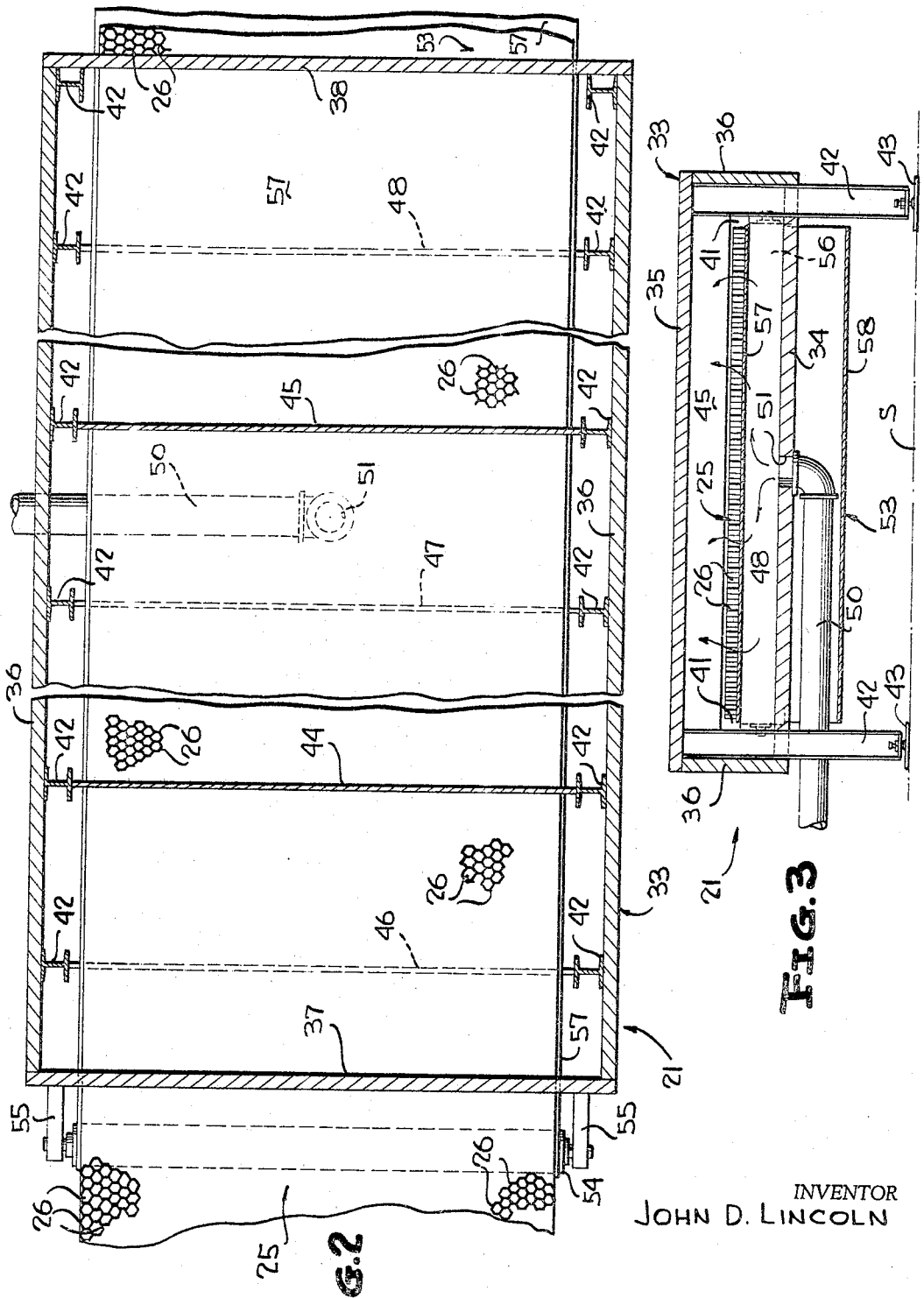

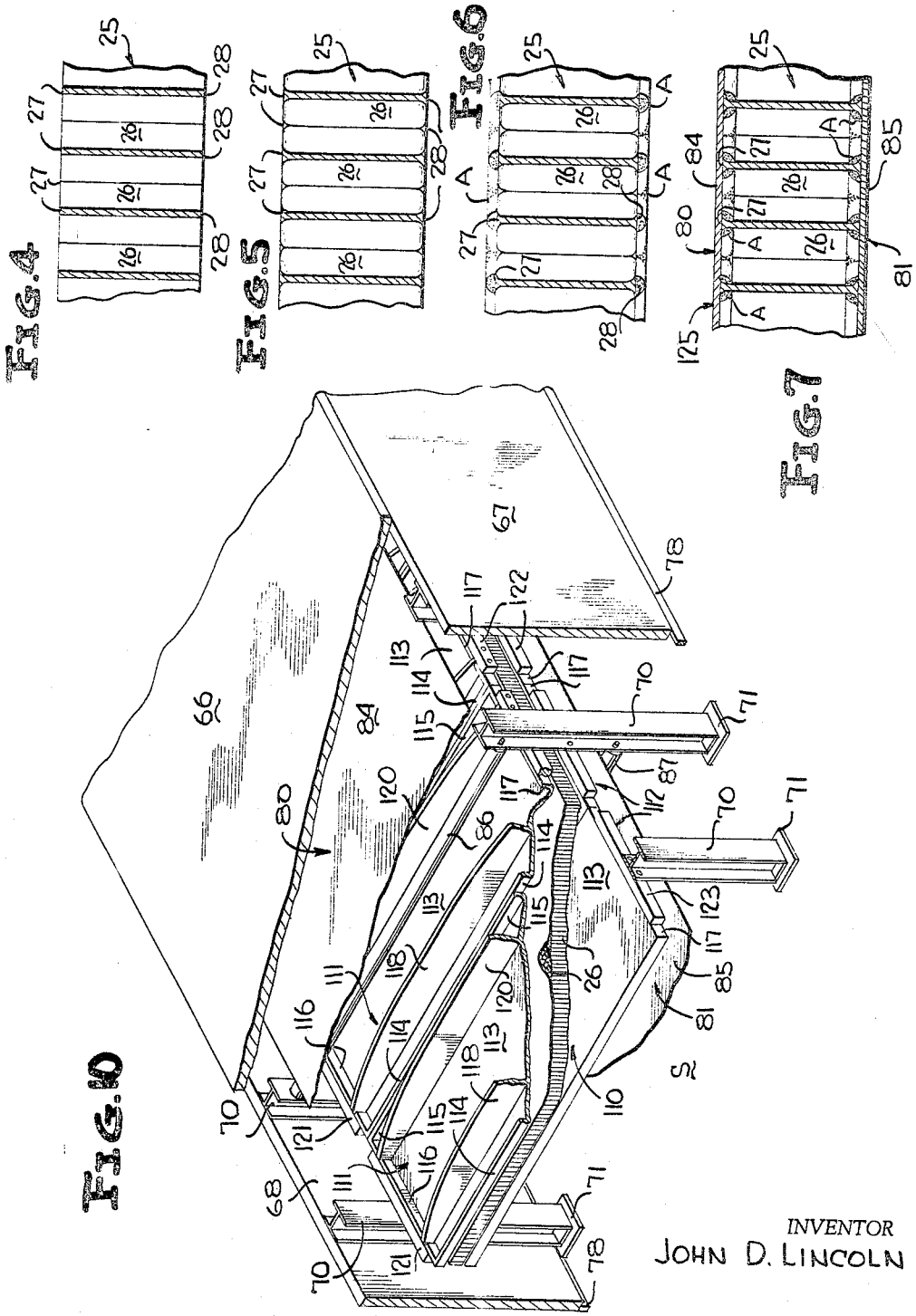

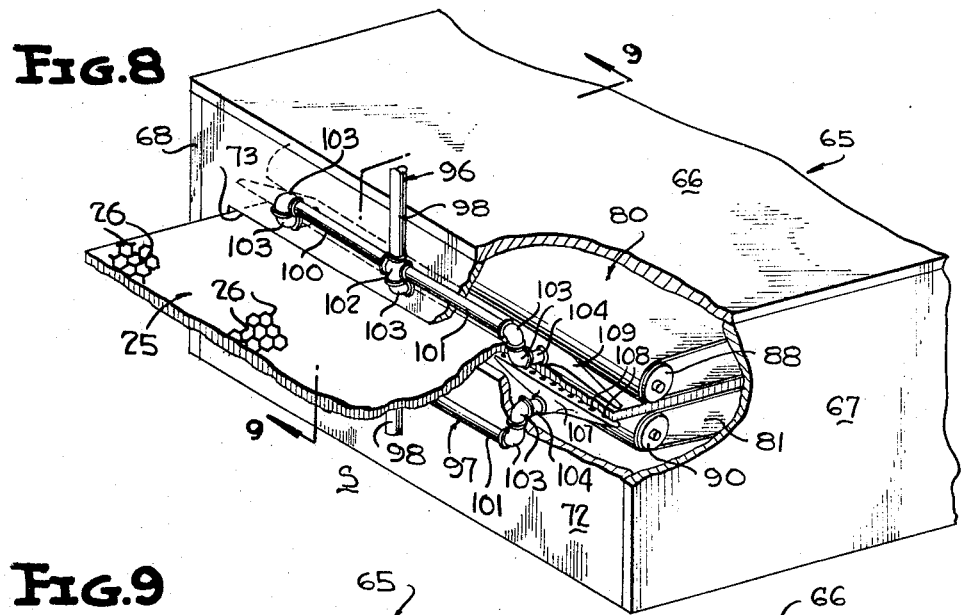
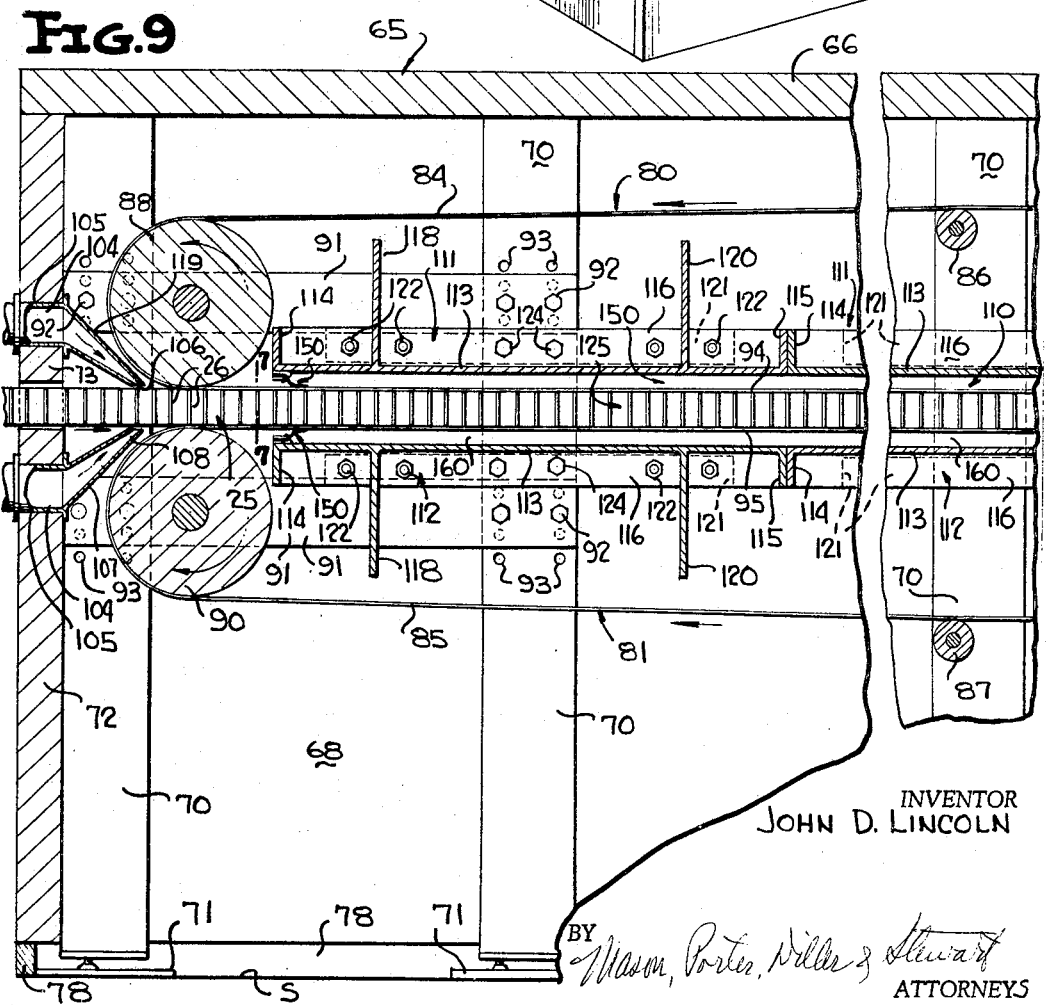

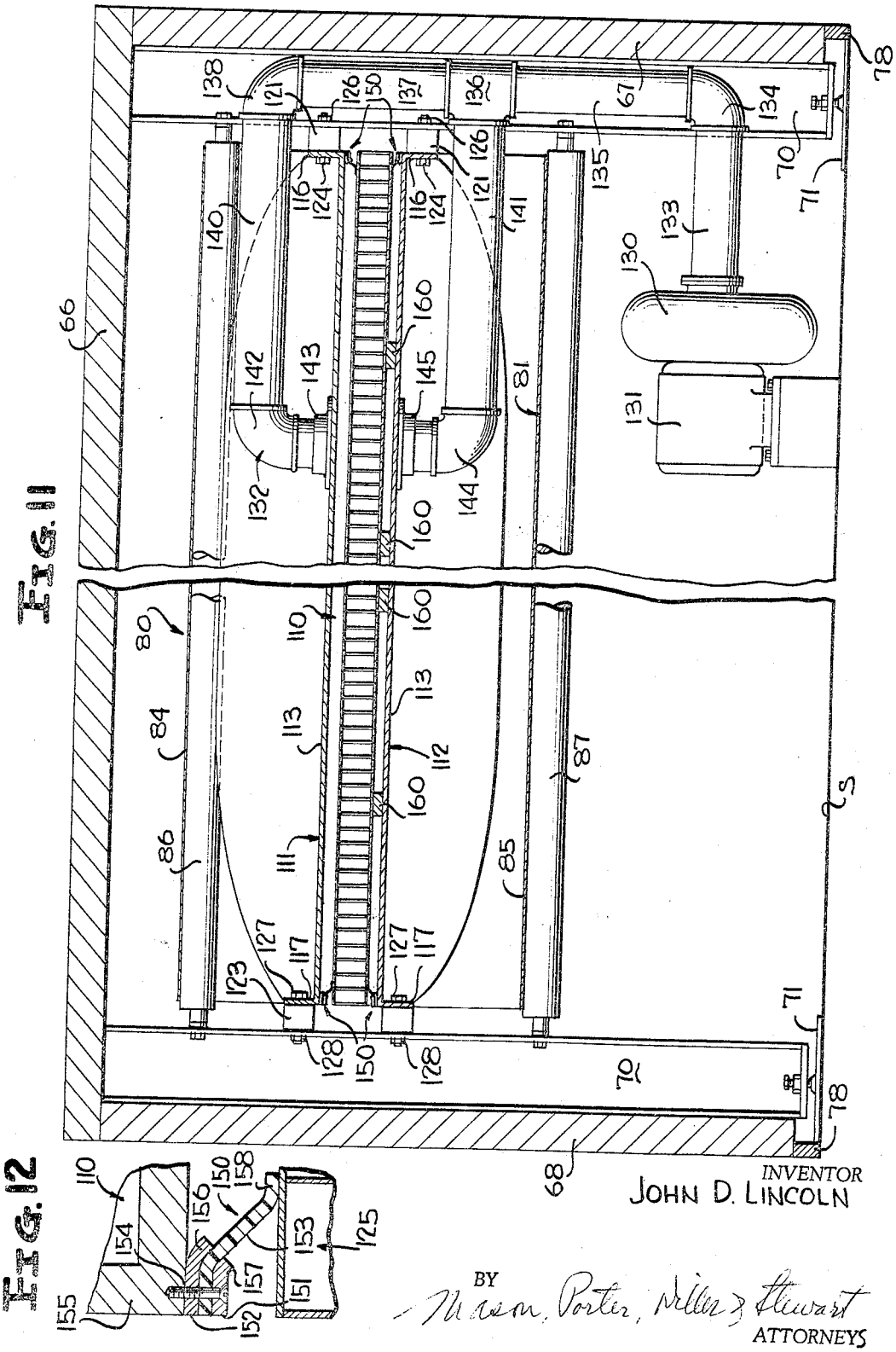

3,490,977
APPARATUS FOR LAMINATING CONTINUOUS HONEYCOMB AND ALUMINUM FACINGS OR SKINS
John D. Lincoln, Mount Vernon, Ohio, assignor to Continental Can Company, Inc., New York, N.Y., a corporation of New York
Filed Nov. 15, 1963, Ser. No. 323,968
Int. Cl. B32b 31/08, 31/20
U.S. Cl. 156—285          22 Claims

ABSTRACT OF THE DISCLOSURE

This disclosure relates to novel apparatus for laminating a sheet material facing or skin to opposed surface portions of a continuous honeycomb core by simultaneously creating a pressure differential between the honeycomb core and exposed surfaces of the sheet material facings, applying a pressurized medium directly against the exposed surfaces of the facings, and tensioning each of the sheet material facings by drawing the facings along a substantially continuous predetermined path of travel.

---

Continuous honeycomb cores are conventionally manufactured in several different, though related, ways by successive operations which may be initiated, for example, by cutting, stacking and securing together a plurality of relatively thin sheets of paper, plastic, metal or similar thin and lightweight material. The sheets are generally secured together by an adhesive which is applied to each side of the sheets in spaced parallel lines with the lines on opposite sides of each sheet being in offset relationship. After the adhesive has dried the plurality of sheets are expanded to form a plurality of cells which are each hexagonally shaped in cross-section but may be of different cross-sectional configurations depending upon the particular manner in which the adhesive is applied to the sheets.

The sheet material facing or skin is then secured to exposed edges of the honeycomb cells of each surface of the honeycomb core to form a laminated honeycomb structure. The sheet material facings are generally thicker and stronger than the material forming the core and may be of the same material as the core material, but are usually sheets or webs of metallic material, such as aluminum, aluminum alloy or steel. These facings are usually secured to the honeycomb core by applying an adhesive to the exposed edges of the cells and thereafter forcing the facings against the core by passing the facings and the core interposed therebetween through a pair of synchronously driven conveyor belts which urge the facings against the honeycomb core. After the adhesive has dried the continuous laminated honeycomb is conveyed or transported beyond the pair of conveyor belts and is transversely secered into discrete blanks.

Prior to this novel invention, conventional methods of and apparatus for producing laminated honeycomb, in much the same manner as that briefly described above, possessed many inherent disadvantages which, for the most part, are overcome by the method and apparatus of this invention. For example, during the conventional lamination of the facings to the honeycomb core, it is essential that the pair of conveyor belts are driven at an identical rate of speed and that no off-tracking occurs which would shift the facings relative to each other and tend to strip the same from the honeycomb core.

In accordance with this invention, the conventional pair of driven conveyor belts is entirely eliminated and air under pressure is instead directly applied against exposed surfaces of the facings to urge the same into intimate contact with the honeycomb core and thereby directly eliminating any tendency of relative shifting between the honeycomb core and the facings.

During the conventional forming of honeycomb cores, it is also extremely desirable to maintain the exposed edges of the honeycomb cells in coplanar relationship so that a facing applied to each surface of the honeycomb core will intimately engage each of these exposed edges to effect an adhesive bond between each cell edge and an associated facing. This novel invention assures such intimate engagement and adhesive bonding between the edges of the honeycomb cells and the facings by creating a pressure differential between the interior of the cells and the exterior of the facings whereby the facings are additionally urged against the edges of the cells by this pressure differential and the pressurized air being directed against the exposed surfaces of the facings. This pressure differential is produced by directing hot air into the cells of the honeycomb core at a temperature in excess of a temperature in a laminated oven through which the core is conveyed and immediately applying a facing over adhesive coated edges of the cells. As the honeycomb core is conveyed through the oven, the hot air in the cells cools relative to the temperature in the laminator oven to create a pressure drop and setup a partial vacuum within the honeycomb cells effective to augment the pressure directed against the exposed surfaces of the facings to hold the facings in firm bonding engagement against the edges of the honeycomb cells.

The hot air is also directed into the cells of the honeycomb core at a point where the facings are being applied to the honeycomb core. In the case where a thermal setting adhesive is applied to the edges of the cells, the curing of the adhesive begins immediately upon the contact of the facings with the honeycomb edges and no chilling action at and immediately after the contact of the facings with the honeycomb core occurs.

Laminated honeycombs composed of relatively thin, lightweight honeycomb cores and aluminum or aluminum alloy facings are used extensively in the aircraft industry. The honeycomb cores of these laminated honeycombs must not only be flawlessly bonded to the facings, but the desired dimensions of the laminated honeycombs must necessarily be accurate and the waves or ripples which tend to develop during the conventional lamination of the facings to the honeycomb cores must be avoided.

To this end, this novel invention provides means for tensioning the facings as the facings are being laminated to the honeycomb cores whereby dimensional accuracy is achieved and waves or ripples in the facings are substantially eliminated.

It is therefore an object of this invention to provide a novel method of and apparatus for laminating sheet material facings to honeycomb cores in a manner and of a type which substantially eliminates the above-noted disadvantages inherent in conventional prior art methods and apparatus.

Another object of this invention is to provide a novel method of laminating sheet material facings or skins to honeycomb cores by adhesively securing a facing to each surface of a honeycomb core in overlying relationship to exposed edge portions of the honeycomb cells and pneumatically urging the facings into intimate engagement with the surfaces of the honeycomb core by applying a pressurized medium directly against exposed surfaces of the facings.

A further object of this invention is to provide a novel method of laminating sheet material skins or facings to honeycomb cores by the steps of providing a honeycomb core composed of a plurality of cells having exposed edge portions, partially evacuating at least some of the honeycomb cells, securing a sheet material skin or facing to at least one surface of the honeycomb core in overlying relationship to the exposed edge portions of the honeycomb cells, and pneumatically urging the facings against the one surface of the honeycomb core.

Still another object of this invention is to provide a novel method of laminating sheet material skins to honeycomb cores by conveying a honeycomb core composed of a plurality of cells having oppositely exposed edge portions along a predetermined path, applying adhesive to the exposed edge portions of the honeycomb core, applying a facing to the honeycomb core in overlying relationship to the exposed edge portions of the honeycomb cells, creating a pressure difference between the cells and exterior surfaces of the facings, and tensioning the facings by drawing the facing along the predetermined path.

Another object of this invention is to provide novel apparatus for laminating sheet material facings to honeycomb cores comprising means for supporting a honeycomb core interposed between opposed sheet material facings at at least two longitudinally spaced points, means between the spaced points forming a pressure chamber for applying a pressurized fluid medium directly against exposed surfaces of the opposed facings to urge the facings into intimate engagement with the honeycomb core, and means beyond one of the spaced points for conveying the facings between the spaced points and forming the sole means for conveying the honeycomb core and facings through the pressure chamber.

A further object of this invention is to provide novel apparatus of the type immediately above-described, and including means for tensioning the facings as the facings are being conveyed between the spaced points to assure intimate engagement between the facings and the honeycomb core.

A further object of this invention is to provide novel apparatus of the character heretofore described, and including means for creating a pressure differential between the interior of the honeycomb core and exposed surfaces of the facings to additionally assure intimate engagement between the facings and the exposed edges of the honeycomb core.

Another object of this invention is to provide novel apparatus for laminating facings in intimate engagement with honeycomb cores comprising a chamber, means establishing a pre-selected temperature in the chamber, means for applying sheet material facings to opposed surface portions of the honeycomb core, means for heating selected portions of the honeycomb core beyond the pre-selected temperature in the chamber, and means for conveying the facings and honeycomb core through the chamber whereby relative cooling of the selected portions of the honeycomb core creates a pressure differential between the interior of the honeycomb core and the exterior surfaces of the facings to urge the facings into intimate engagement with the honeycomb core.

With the above, and other objects in view that will hereinafter appear, the nature of the invention will be more clearly understood by reference to the following detailed description, the appended claims and the several views illustrated in the accompanying drawings:

In the drawings:

FIGURES 1–A, 1–B and 1–C when matched together as indicated, form a diagrammatic elevational view, and illustrate a novel apparatus constructed in accordance with this invention for laminating facings to honeycomb cores.

FIGURE 2 is an enlarged fragmentary horizontal sectional view taken along line 2—2 of FIGURE 1–A, and illustrates a honeycomb core composed of a plurality of honeycomb cells being conveyed through an expanding unit.

FIGURE 3 is an enlarged, fragmentary, vertical sectional view taken along line 3—3 of FIGURE 1–A, and additionally illustrates the honeycomb core and expanding unit of FIGURE 2.

FIGURE 4 is an enlarged, fragmentary vertical sectional view taken along line 4—4 of FIGURE 1–A, and illustrates upper and lower exposed edges of honeycomb cells forming the honeycomb core after being conveyed through the expanding unit.

FIGURE 5 is an enlarged, fragmentary, vertical sectional view taken along line 5—5 of FIGURE 1–A, and illustrates the configuration of the upper and lower edges of the honeycomb cells after the honeycomb core has passed between a pair of roll sanders.

FIGURE 6 is an enlarged, fragmentary vertical sectional view taken along line 6—6 of FIGURE 1–A, and illustrates adhesive deposited upon and supported by the edges of the honeycomb cells.

FIGURE 7 is an enlarged, fragmentary vertical sectional view taken along line 7—7 of FIGURE 9, and illustrates a sheet material facing or skin applied to opposite surfaces of the honeycomb core.

FIGURE 8 is a fragmentary, enlarged, end perspective view taken along line 8—8 of FIGURE 1–A with portions broken away and removed for clarity and illustrates the honeycomb core being conveyed into and through a laminator oven, a sheet material facing or skin being applied to opposite surfaces of the honeycomb core in the laminator oven and upper and lower manifolds for directing hot air into the cells of the honeycomb core.

FIGURE 9 is an enlarged, fragmentary, longitudinal sectional view taken along line 9—9 of FIGURE 8, and more clearly illustrates the application of the facings to the honeycomb core and the passage of the laminated honeycomb through a pressure chamber in the laminator oven.

FIGURE 10 is a fragmentary top perspective view of the laminator oven of FIGURES 8 and 9 with portions broken away for clarity, and more clearly illustrates the structural arrangement of the pressure chamber in the laminator oven.

FIGURE 11 is an enlarged, fragmentary, transverse sectional view taken along line 11—11 of FIGURE 1–A, and illustrates upper and lower ducts for communicating a pressurized medium into the pressure chamber and sealing gaskets preventing the escape of the pressurized medium from the interior of the pressure chamber.

FIGURE 12 is an enlarged fragmentary sectional view of one of the sealing gaskets of FIGURE 11, and illustrates the sealing gasket being urged by the pressurized medium in the pressure chamber against a facing of the laminated honeycomb.

An apparatus for laminating a sheet material facing or skin to opposite surfaces of a honeycomb core is illustrated in FIGURES 1–A, 1–B and 1–C of the drawings, and is generally designated by the reference numeral 20. The apparatus 20 comprises an expanding unit 21 including a first pair of driven expanding rolls 22 and a second pair of driven expanding rolls 23. The pair of expanding rolls 22 and 23 are driven at a differential rate of speed with the expanding rolls 23 rotating faster than the pair of expanding rolls 22. This differential speed between the pairs of expanding rolls 22 and 23 causes a portion 24 of a honeycomb core 25 drawn between these pairs of rolls to expand and form a plurality of honeycomb cells 26 (see FIGURE 2) having exposed upper edges 27 and exposed lower edges 28 (FIGURE 4).

The portion 24 of the honeycomb core 25 is supported during the expansion thereof by the pairs of expanding rolls 22 and 23, and a platform 30 supported in a conventional manner. The platform 30 is provided with a plurality of freely rotatable rolls 31 arranged transversely of the length of the honeycomb core 25. The bight portions (unnumbered) of the plurality of transversely supported rolls 31 are spaced so that steam directed upwardly (as viewed in FIGURE 1–A) from a pair of transversely arranged steam manifolds 32 will pass between the bight portions of the rolls 31 and impinge against the expanded portion 24 of the honeycomb core 25.

An expanding chamber 33 (FIGURES 1-A, 2 and 3) of the expanding unit 21 is positioned adjacent the pair of expanding rolls 23. The expanding chamber 33 has a bottom wall 34, a top wall 35, a pair of identical side walls 36, 36 an entrance wall 37 and an exit wall 38. A transverse opening 40 is provided in the entrance wall 37 of the expanding chamber 33 by means of which the honeycomb core 25 is introduced into the interior of the chamber. A substantially identical transverse opening 41 (FIGURE 3) is formed in the exit wall 38 of the expanding chamber 33 to permit the withdrawal of the honeycomb core 25 from within this chamber.

A plurality of vertical I-beams 42 (FIGURES 2 and 3) are each welded or otherwise secured in a conventional manner to the side walls 36, 36 of the chamber 33. Conventional adjustable pads or feet 43 are secured at a lowermost portion of each of the I-beams 42 for adjusting the expanding chamber 33 relative to a surface S.

Downwardly depending baffle 44 and 45 (FIGURE 2) are secured between transversely aligned pairs of the plurality of I-shaped beams 42 and the top wall 35 (FIGURE 3) of the chamber 33. The baffles 44 and 45 are in spaced parallel relationship to each other and to the exit and entrance walls 38 and 37 respectively. Upwardly directed baffles 46 through 48 are similarly secured to transversely aligned pairs of I-beams 42 and to the bottom wall 34 of the chamber 33, as is best illustrated in FIGURE 3. The baffles 46 through 48 are also longitudinally offset with respect to the baffles 44 and 45 (FIGURE 2), to establish a path of travel for hot air introduced into the expanding chamber 33, in a manner clearly illustrated in FIGURE 1-A of the drawings.

Hot air is introduced into the interior of the chamber 33 by a duct or manifold 50 placed in fluid communication with the interior of the chamber 33 by a circular opening or aperture 51 (FIGURE 3) in the bottom wall 34 of the chamber 33. The duct 50 is also coupled in a conventional manner to an electrically operated pump 52 (FIGURE 1-A). Hot air from a conventional source (not shown) is communicated by the pump 52 and the duct 50 into the interior of the chamber 33 in a manner clearly illustrated in FIGURES 1-A, 2 and 3 of the drawings.

The honeycomb core 25 is conveyed through the expanding chamber 33 of the expanding unit 21 by a chain conveyor or belt 53, which is preferably of a mesh or lattice-type construction to permit the passage of air therethrough in a conventional manner to be described hereafter. The conveyor belt 53 is entrained about an idler pulley 54 secured to the entrance wall 37 of the chamber 33 by a pair of identical brackets 55, 55 (FIGURE 2) and a driven roller 56 (FIGURES 1-A and 3) similarly secured adjacent the exit wall 38 of the chamber 33. An upper conveyor belt run 57 of the conveyor belt 53 passes through the transverse openings 40, 41 in the respective walls 37 and 38 of the expanding chamber 33 while a lower conveyor belt run 58 of the conveyor belt 53 passes beneath the bottom wall 34 and the duct 50, as is best illustrated in FIGURE 3 of the drawings.

The upper conveyor belt run 57 of the conveyor belt 53 is supported by the upper transverse edges of the upwardly projecting baffles 46–48 as is best illustrated in FIGURES 1-A and 3 of the drawings. An idler roll 60 (FIGURE 1-A) is secured adjacent the exit wall 38 of the chamber 33 by a pair of brackets (not shown) which may, for purposes of this invention, be identical to the brackets 55, 55 securing the idler roll 54 to the entrance wall 37 of the chamber 33.

The purpose of the expanding chamber 33 of the expanding unit 21 is to set the honeycomb core 25 and the expanded cells thereof in the configuration illustrated in FIGURE 2 of the drawings. As has been heretofore noted, the honeycomb core 25 is initially non-expanded and after being expanded has a tendency to rebound to its original non-expanded form. Where the honeycomb core 25 is constructed from thin paper material, the forces created in the honeycomb core 25 by the pairs of expanding rollers 22, 23 tend to collapse the honeycomb cells 26 after the passage of the honeycomb core 25 beyond the bight of the pair of expanding rolls 23. However, by driving the conveyor belt 53 at a speed equal to the speed of the expanding rolls 23, the cells 26 remain expanded during the passage of the honeycomb core 25 through the expanding chamber 33.

The hot air introduced into the expanding chamber 33 by the duct 50 progressively dries the honeycomb core 25, noting that the honeycomb core 25 is in a moist condition when initially introduced into the chamber 33 because of the steam directed against the core 25 by the steam manifolds 32. As the honeycomb core 25 dries in the expanding chamber 33, the honeycomb cells 26 are set to the configuration thereof shown in FIGURE 2 and retain this configuration after passage between the bight of the rolls 56 and 60.

It should also be particularly noted that the hot air is introduced into the interior of the chamber 33 at a point substantially midway between the entrance wall 37 and the exit wall 38. This establishes a tortuous flow-path of hot air from the center of the chamber 33 toward both walls 37 and 38. This flow-path of the hot air provides gradual heating of the honeycomb core 25 and is advantageous in driving off undesirable volatile constituents of the honeycomb core 25 with minimum loss of desirable constituents. For example, the adhesive which secures the sheet material of the honeycomb core 25 together may include both alcohol and formaldehyde forming respective undesirable and desirable constituents of the adhesive. The gradual heating of the honeycomb core 25 in the expanding chamber 33 drives off the volatile, undesirable alcohol with a minimum loss of formaldehyde.

The upper edges 27 and lower edges 28 of the honeycomb cells 26 are sanded by a drum sander unit 61 (FIGURE 1-A) positioned downstream from the rolls 56 and 60. The drum sander unit 61 is of a conventional unit construction and comprises a pair of driven drum sanders 62, 62 supported on opposite sides of the honeycomb core 25. As the honeycomb core 25 passes between the bight of the drum sanders 62, 62 the edges 27 and 28 of the honeycomb cells 26 are broadened out to the configuration illustrated in FIGURE 5 of the drawings. A greater amount of adhesive can be applied to these broadened edges, in a manner to be described immediately hereafter. The additional adhesive applied to these broadened edges and the relatively roughened surfaces of the edges approximately double the bond strength between the honeycomb core and facings or skins laminated thereto as compared to the bond strength achieved in conventional laminated honeycomb structures.

The drum sander unit 61 also controls the thickness of the honeycomb core 25 and assures that the surfaces defined by the edges 27 and 28 of the honeycomb cells 26 are substantially planar.

Adhesive or glue applicators 63, 63 (FIGURE 1-A) are supported downstream from the drum sander unit 61. These adhesive applicators 63, 63 are of a conventional construction, and a further description thereof is deemed unnecessary for a complete understanding of this invention.

As the honeycomb core 25 is conveyed between the adhesive applicators 63, 63, adhesive A (FIGURE 6) is applied to the broadened out upper edges 27 and the broadened out lower edges 28 of the honeycomb cells 26. The adhesive A is preferably a relatively viscous, thermal-setting or heat-bonding resinous compound which is set or cured by the passage of the honeycomb core 25 through a heated laminator oven or chamber 65 (FIGURES 1–A, 1–B, and 8 through 11).

The laminator oven or first chamber 65 comprises a top wall 66, a first side wall 67 and a second side wall 68. The walls 66–68 are welded or otherwise conventionally secured to a plurality of transversely aligned and longitudinally spaced I-beams 70. An identical, adjustable leveling pad or foot 71 is carried by each of the I-beams 70 for adjusting the laminator oven 65 with respect to the surface S in a known manner.

The laminator oven 65 is closed at one end thereof by an entrance wall 72 (FIGURES 8 and 9) having a transverse opening 73, while an opposite end of the laminator oven 65 is similarly closed by an exit wall 74 (FIGURE 1–B) having a similar transverse opening 75. A pair of transverse openings 76 and 77 are also provided in the exit wall 74 of the laminator oven 65, as is best illustrated in FIGURE 1–B of the drawings. The transverse opening 76 is above and parallel to the transverse opening 75 while the transverse opening 77 is similarly parallel to the transverse opening 75 but located below this latter transverse opening. The transverse openings 73 and 75 through 77 may be sealed in a conventional manner to prevent the escape of heat introduced into the laminator oven 65 in a manner to be described hereafter, and a sealing strip 78 (FIGURES 9–11) is provided between lowermost edges of the walls 67, 68, 72 and 74 to similarly prevent the escape of hot air from the interior of the laminator oven 65.

An upper sheet material facing or skin 80 in the form of a continuous web or strip is fed into the interior of the laminator oven 65 through the transverse opening 76. A lower sheet material skin or facing 81 is similarly introduced into the interior of the laminator oven 65 through the transverse opening 77. The sheet material skins or facings 80 and 81 are preferably aluminum, and are drawn from tensioned supply rolls 82 and 83 respectively (FIGURE 1–C). An upper run 84 of the facing 80 is guided in its movement through the laminator oven 65 by a plurality of identical idler rollers 86 secured between transversely aligned pairs of the plurality of I-beams 70, as is best illustrated in FIGURES 10 and 11 of the drawings. A lowermost run 85 of the sheet material facing 81 is similarly guided through the laminator oven 65 by a plurality of identical idle rolls 87 which are secured between the same selected pairs of transversely aligned I-beams 70 as are the rolls 86.

The facing 80 is entrained about an idle roll 88 while the facing 81 is similarly entrained about an idle roll 90. The idle rolls 88 and 90 are supported at each end thereof by an identical bracket 91 (FIGURE 9) bolted between a pair of the longitudinally spaced I-beams 70 adjacent the entrance wall 72. Bolts 92 securing the brackets 91 to the I-beams 70 are received in associated openings 93 (FIGURE 9) formed in the flanges (unnumbered) of the I-beams 70. The plurality of openings 93 in the I-beams 70 permit the idler rolls 88 and 90 to be spaced apart various distances to accommodate different thicknesses of honeycomb cores passing between the bights of these idle rolls, as is best illustrated in FIGURE 9 of the drawings.

A lower run 94 of the facing 80 is applied to the upper surface of the honeycomb core 25 by the idle roll 88 and an uppermost run 95 of the facing 85 is similarly applied to the lowermost surface of the honeycomb core 25 by the idler roll 90 as the honeycomb core 25 is conveyed between the bight portion of these latter rolls. The application of the runs 94 and 95 of the respective facings 80 and 81 is clearly illustrated in FIGURE 9 of the drawings.

During the application of the facings 80 and 81 to the honeycomb core 25 by the idler rolls 88 and 90 respectively, hot air is introduced into each of the honeycomb cells 26 by an upper hot air manifold 96 (FIGURE 8) and a lower hot air manifold 97. The hot air manifolds 96 and 97 are substantially identical and each comprises a central duct 98 in fluid communication with a conventional source of hot air which is preferably at a temperature of approximately 350 degrees F. Each of the central ducts 98 is coupled to a pair of pipes 100, 101 by a conventional fitting 102 at the exterior of the entrance wall 72 above and below the transverse opening 73. The pipes 100 and 101 of the hot air manifolds 96 and 97 are each placed in fluid communication with the interior of the laminator oven 65 by a plurality of conventional elbows 103 and short pipe sections 104. There are three such short pipe sections 104 forming a portion of each of the hot air manifolds 96 and 97, and each of the pipe sections 104 is received through an associated opening 105 (FIGURE 9) in the entrance wall 72 of the laminator oven 65. The pipe sections 104 of the hot air manifold 96 are attached in a conventional manner to a transverse, elongated, nozzle 109 having a plurality of orifices 106 (only one orifice 106 being illustrated in FIGURE 9) for directing hot air into the cells 26 of the honeycomb core 25. A transverse elongated nozzle 107 is similarly secured in a conventional manner to the pipe sections 104 of the hot air manifold 97, and a plurality of orifices 108 of the transverse nozzle 107 similarly directs hot air into the interior of the honeycomb cells 26 of the honeycomb core 25. As is best illustrated in FIGURE 9 of the drawings, the nozzles 109 and 107 direct the hot air into the cells 26 of the honeycomb core 25 at a point immediately adjacent the point at which the facings or skins 80 and 81 are applied to the honeycomb core 25 by the idle rolls 88 and 90 respectively.

As has been heretofore noted, the interior of the laminator oven 65 is heated to cure or set the adhesive A applied to the broadened edges 27 and 28 of the honeycomb core 25. This heat may be introduced into the interior of the laminator oven 65 in any conventional manner, as for example, by a pump and duct similar to the pump and duct 52 and 50 respectively of the expanding unit 21 of FIGURE 1–A. Such pump would be in fluid communication with a source of hot air at a temperature substantially less than the temperature of the hot air introduced into the laminator oven 65 by the hot air manifolds 96 and 97. The temperature so introduced into the laminator even 65 by this conventional pump and duct is preferably approximately 250 degrees F., thereby establishing a temperature in the interior of the laminator oven 65 of approximately 250 degrees F. This is substantially a 100 degree F. temperature difference between the temperature in the interior of the laminator oven 65 and the temperature introduced into each of the plurality of honeycomb cells 26 by the hot air manifolds 96 and 97. This 100 degree F. temperature difference performs the following functions:

First, the runs 84 and 85 of the respective facings or skins 80 and 81 are preheated in the laminator oven 65 between the time they enter the laminator oven 65 through the respective transverse openings 76 and 77 and are applied by the respective idler rolls 88 and 90 to the honeycomb core 25. In the absence of the hot air manifolds 96 and 97, the honeycomb core 25 would be relatively cool as compared to the temperature of the facings 80 and 81. However, the hot air (at approximately 350 degree F.) directed toward the bight between the idler rollers 88 and 90 heats the honeycomb core 25 and assures that there is no chilling action at the time of and immediately after the runs 94 and 95 of the respective facings 80 and 81 contact the honeycomb core 25.

Secondly, curing or setting of the adhesive A starts immediately before the contact of the runs 94 and 95 of the facings 80 and 81 respectively with the honeycomb core 25. This eliminates the necessity of a heating zone in the laminator oven 65 which would gradually bring the temperature of the adhesive A up to its bonding or setting temperature after the application of the facings 80 and 81 to the honeycomb core 25.

Finally, the hot air at approximately 350 degrees F. directed into each of the plurality of honeycomb cells 26 by the hot air manifolds 96 and 97 is trapped in these honeycomb cells by the skins or facings 80 and 81 applied to the edges 27 and 28 of the honeycomb cells 26. As the honeycomb core 25 with the facings 80 and 81 applied thereto (hereinafter referred to as laminated honeycomb) passes through the laminator oven 65, the hot air in the honeycomb cells 26 gradually cools relative to the 250 degrees F. temperature of the laminator oven and brings about a pressure drop in these cells. This pressure drop sets up a partial vacuum within each of the honeycomb cells 26 which urges the facing runs 94 and 95 into intimate engagement with the edges 27 and 28 of the honeycomb core 25, as is best illustrated in FIGURE 7 of the drawings. This partial vacuum is also effective to augment air pressure which is directly applied to the exterior surfaces of the portions 94 and 95 of the respective facings 80 and 81 during the passage of the now laminated core (referred to by the reference numeral 125) through a pressure chamber 110 of the laminator oven 65.

The pressure chamber 110 is best illustrated in FIGURES 9 through 11 of the drawings, and includes a plurality of identical upper panels 111 and lower panels 112. Each of the panels 111 and 112 includes a substantially flat, rectangular base plate 113, marginal side plates or flanges 114, 115 and marginal end plates or flanges 116 and 117. A rib 118 extends between the end plates 116 and 117 of each of the panels 111 and 112 in adjacent, spaced, parallel relationship to each of the side plates 114. A similar reinforcing rib 120 extends between the end plates 116 and 117 of each of the panels 111 and 112 in adjacent, spaced, parallel relationship to an associated one of the side plates 115.

A load distribution bar 121 (FIGURE 10) is secured to each of the end plates 116 by a plurality of nuts and bolts 122 (FIGURE 9). A substantially identical load distribution bar 123 is secured to each end plate 117 of the panels 111 and 112 by a plurality of nuts and bolts (not shown) which may be, for example, identical to the nuts and bolts 122 securing the load distribution bars 121 to the end plates 116.

The panels 111 and 112 of the pressure chamber 110 are each secured between transversely aligned pairs of the plurality of I-beams 70 by a pair of bolts 124 (FIGURE 9) received through openings (unnumbered) in the end plates 116 and the load distribution bars 121, and through a pair of a plurality of openings 93 in the flanges of the I-beams 70, as is best illustrated in FIGURES 9 and 11 of the drawings. A nut 126 is threadably secured to the ends of each of the bolts 124, as is best illustrated in FIGURE 11 of the drawings. A pair of bolts 127 (only one bolt of each pair being illustrated in FIGURE 11) are similarly passed through the end flanges 117, load distribution bars 123 and through the openings in the flanges of the I-beams 70 corresponding to the openings 93 shown in FIGURE 9 of the drawings. A nut 128 is threaded to each of the bolts 127 to secure the end plates 117 of the panels 111 and 112 to these I-beams.

The width of the pressure chamber 110 is defined by the length of the panels 111 and 112 while the length of the pressure chamber 110 is defined by the combined widths of the panels 111 and/or 112. Thus, the length of the chamber 110 can be increased by adding additional panels identical to the panels 111 and 112 or if desired, the length of the pressure chamber 110 can be decreased by removing opposing pairs of these panels 111 and 112. It should also be particularly noted that the depth of the pressure chamber 110 defined by the distance between opposing base plates 113, 113 of the panels 111 and 112 can be increased or decreased by adjusting these panels by placing the bolts 124 and 126 in selected pairs of the openings 93 in the flanges of the I-beams 70. This adjustment of the pressure chamber 110 in length, width and thickness permits the lamination of various different types and thicknesses of honeycomb cores, as well as the use of slow or fast drying adhesives and facings or skins formed of metal or non-metallic material.

Compressed air is introduced into the interior of the chamber 110 by a pump 130 (FIGURE 11) which is energized by an electric motor 131. The pump 130 is connected to a pressure manifold system 132 positioned substantially midway between the entrance wall 72 and exit wall 74 of the laminator oven 65, as is best illustrated in FIGURES 1–A and 1–B of the drawings. The pump 130 is connected to the pressure manifold system 132 by a horizontal pipe or conduit 133, an elbow 134, a first vertical pipe or conduit 135, a T-fitting 136, a second vertical pipe or conduit 137 and another conventional elbow 138. Upper and lower transversely extending ducts 140 and 141 respectively of the pressure manifold system 132 are each respectively coupled to the elbow 138 and the T-fitting 136.

An elbow 142 and a fitting 143 place the upper duct 140 of the pressure manifold system 132 into fluid communication with the interior of the pressure chamber 110 through an opening (not shown) in a base plate 113 of one of the panels 111. A similar elbow 144 and a fitting 145 place the lower duct 141 of the pressure manifold system 132 into fluid communication with the interior of the pressure chamber 110 through an opening (not shown) in a base plate 113 of one of the panels 112. The fittings 143 and 145 are preferably conventionally "quick-fit" to the base plates 113 to permit rapid connection and disconnection between these fittings and the base plates 113 in a conventional manner. The purpose of employing quick-fittings as the fittings 143 and 145 is to permit the rapid removal of either or both of these fittings and the replacement thereof by other fittings which may be longer or shorter in length to accommodate depth adjustment of the pressure chamber 110 when the panels 111 and 112 are adjusted with respect to each other in the manner heretofore described.

Identical sealing gaskets 150 are secured to each of the base plates 113 of the panels 111 and 112 of the pressure chamber 110 to prevent the escape of pressurized air introduced into the pressure chamber 110 through the pressure manifold system 132. Each sealing gasket 150 secured to the panels 111 is opposed by an identical sealing gasket 150 secured to each of the panels 112. The sealing gaskets 150 completely marginally bound the pressure chamber 110. That is, a sealing gasket 150 is secured to the base plate 113 of each of the panels 111 and 112 at a side opposite the end plates 116 and 117, and one such sealing gasket is also secured opposite the side plates 114, 114 of the leading panels 111, 112 adjacent the idler rolls 88, 90 and to the side plates 115, 115 of the trailing panels 111, 112 (not shown) adjacent the transverse opening 75 in the exit wall 74.

One such sealing gasket 150 is illustrated in FIGURE 12 of the drawings and comprises a pair of plates 151 and 152 sandwiching therebetween a gasket member 153. A plurality of identical screws 154 (only one being illustrated in FIGURE 12) secure the plates 151 and 152, as well as the gasket member 153, along a marginal portion 155 of the pressure chamber 110. The gasket member 153 is preferably constructed from elastomeric material, such as plastic or rubber, but may be formed from resilient strip metal, or sheet steel. Curved portions 156 and 157 of the respective plates 152 and 151 direct the gasket member 153 toward the interior of the pressure chamber 110. An end portion 158 of the sealing gasket 150 bends or deforms under the pressure introduced into the pressure chamber 110 by the pressure manifold system 132 and intimately contacts exposed surfaces of the skins or facings to prevent air from escaping outwardly of the pressure chamber 110. Thus, air under pressure introduced into the interior of the pressure chamber 110 acts directly against the exposed surfaces of the facings or skins 80 and 81 as the laminated core 125 is conveyed through the pressure chamber 110. This pressure acting directly against the exposed surfaces of the facings 80 and 81 cooperates with the partial vacuum formed in each of the cells 26 in a manner heretofore described to urge the facings into intimate engagement with the honeycomb core 25 during the movement thereof through the laminator oven 65. It should be particularly noted that the honeycomb core 25 of the laminated honeycomb 125 is supported only by the upper run 95 (FIGURE 9) of the facing or skin 81 during the movement of the laminated core 125 through the laminator oven 95. The upper run 95 of the facing or skin 81 is supported by a plurality of supporting strips 160 which are welded or otherwise conventionally secured to the base plate 113 of each of the panels 112. The supporting strips 160 are preferably constructed from material having an extremely low coefficient of friction to substantially eliminate drag between these supporting strips 160 and the upper run 95 of the facing or skin 81.

The honeycomb core 25, the facing 80 and the facing 81 are all simultaneously conveyed through the laminator oven 65 by two pairs of pull rolls 161 and 162 (FIGURE 1–C). The pull rolls 161 and 162 not only convey the honeycomb core 25 and the facings 80, 81 through the laminator oven 65, but also subject the facings 80 and 81 to extremely high tension forces which maintain the facings 80 and 81 relatively flat, planar and free of wrinkles or waves in a manner to be described immediately below.

As heretofore described, the sheet material facings or skins 80 and 81 are supplied from tensioned rolls or coils 83 and 84 (FIGURE 1–C). These coils 82 and 83 are tensioned in a manner well known in the prior art and a further description thereof is considered unnecessary for a complete understanding of this invention.

Where the facings or skins 80 and 81 are composed of aluminum or aluminum alloy, the facings are each guided over a plurality of rolls 163, 164 into an associated identical tank 165. A suitable detergent compound (not shown) and a group of Nylon scrubber brush rolls 166, 167 in each of the tanks 165 clean the aluminum facings or skins 80 and 81.

The facings 80 and 81 pass out of associated ones of the tanks 165, 165 and excess detergent is removed therefrom by conventional, identical squeegees 168.

The facings 80 and 81 are then introduced into identical tanks 170 having conventional spray nozzles 171 for directing rinse water against opposite faces of the facings to remove remaining detergent compound therefrom and rinse the facings. After being completely rinsed, a pair of squeeze rolls 172 associated with each of the tanks 170 removes the excess rinse water from each of the facings 80 and 81.

After the aluminum facings 80 and 81 have been rinsed, but before these facings are introduced into the laminator oven 65, each surface of the facings 80 and 81 is abraded by a plurality of abrading rolls 173 which are each backed up by an idler roll 174. The abrading rolls 173 are each driven in a direction opposite to the direction of movement of the facings 80 and 81, as is best illustrated in FIGURE 1–B by directional arrows. This reverse movement of the abrading rolls 173 not only removes the oxide coating of each face of the facings 80 and 81, but also tends to draw the facings 80 and 81 in a direction opposing the forces applied to the facings 80 and 81 by the pull rolls 161 and 162 (FIGURE 1–B and 1–C). The Nylon scrubber brush rolls 166 and 167 in the tanks 165 are also rotated in a direction to oppose the tension forces applied to the facings 80 and 81 by the pull rolls 161 and 162. Thus, the pull rolls 161 and 162 acting in one direction and the abrading rolls 173, brushes 166, 167 and the conventional brake of the supply rolls 82 and 83 acting in an opposite direction set up tension forces in the facings 80 and 81 which flatten and substantially eliminate waves and wrinkles in the facings as the same are laminated to the honeycomb core 25 during movement through the laminator oven 65. A tension force of approximately 10,000 pounds on each of the facings 80 and 81 substantially flattens the webs 94 and 95 of the respective facings 80 and 81 during the lamination thereof to the honeycomb core 25 and substantially precludes the formation of ripples or waves in these laminated portions of the facings.

After the laminated core 125 passes beyond the pull rolls 161 and 162, a conventional flying-shear 175 having a rotatable and transversely reciprocal blade 176 cuts the laminated honeycomb or core 125 into discrete laminated honeycomb blocks or sandwiches 177.

It will be readily apparent upon reviewing the foregoing, that there has been provided by this invention a relatively, simple, efficient and economical apparatus which effectively laminates facings or skins to honeycomb cores in a manner heretofore unprovided for in the prior art by eliminating conventional conveyor means which tend to strip facings from the cores to which they are applied, prevents chilling between the facings and the honeycomb core, and provides intimate contact between the facings and the honeycomb core during the lamination thereof by the substantially simultaneous application of three forces, i.e., a partial vacuum in the cells of the honeycomb core, fluid pressure acting directly against opposed surfaces of the facings and tension applied to the facings during the lamination of the honeycomb cores. However, attention is directed to the fact that variations may be made in the novel apparatus disclosed herein. For example, the hot air manifolds 96 and 97 have been described as being supplied from a source of hot air supply separate and apart from the source of hot air supply which heats the laminator oven 65. However, the hot air manifolds 96 and 97 may be supplied from the same hot air source that supplies the laminator oven 65 with hot air by obtaining the hot air for the manifolds 96 and 97 approximately at the location of the flames creating the source of hot air supply while the laminator oven is supplied with heat taken at a location removed from these flames to create a temperature differential which is sufficient to create a partial vacuum in the honeycomb cells 26 in the manner heretofore described.

The laminator oven 65 and the expanding chamber 33 may also be constructed from insulating material or alternatively, be heavily insulated to prevent rapid dissipation of the heat in each of these components.

If desired or found necessary, suitable guide means may be provided for guiding the honeycomb core 25 through the expanding chamber 33 as well as guiding the facings and honeycomb core through the laminator oven 65. For example, stationary guide means, such as a pair of parallel guide bars or plates could be arranged on opposite sides of the honeycomb core 25 and the laminated honeycomb 125 to insure accurate guiding movement of these numbers through the respective chambers 33 and 65. In lieu of stationary guide means it is also considered within the scope of this invention to provide movable guide means, such as a pair of chains or belts running on edge through the chambers 33 and 65 with a run of each of the chains or belts in contact with exposed edges of the honeycomb core 25. With respect to the laminator oven 65, these chains or belts would run from the interior of the oven adjacent the entrance wall 72 at the point where the facing are applied to the honeycomb core by the idle rolls 88 and 90 to the pull rolls 161 and 162.

In one of the preferred methods of applying skins to a honeycomb core a pair of skins 80, 81 are preferably applied to opposite sides of the core 25 and the present invention is intended to cover methods in which but a single one of the skins 80, 81 is applied to one of the surfaces of the honeycomb core 25. The one single applied skin, would of course, be pneumatically urged into intimate engagement with the single surface of the honeycomb core by pressure differential between the interior of the honeycomb cells and the exterior surface of the one skin applied thereto.

Other variations may be made in the apparatus disclosed herein, as well as in the method, without departing from the spirit and scope of this invention.

I claim:

1. A method of applying skins to honeycomb cores comprising the steps of providing a honeycomb core composed of a plurality of cells having exposed edge portions, securing a sheet material skin to at least one surface of the honeycomb core in overlying relationship to the exposed edge portions of the cells, pneumatically urging the sheet material skin into intimate engagement with the one surface of the honeycomb core by applying a pressurized fluid medium directly against an exposed surface of the sheet material skin and transporting the honeycomb core and the sheet material skin along a common predetermined path of travel during the urging and securing operations for providing a continuous honeycomb core having sheet material skin applied thereto.

2. A method of applying skins to honeycomb cores comprising the steps of providing a honeycomb core composed of a plurality of cells, partially evacuating at least some of the cells and securing a sheet material skin to at least one surface of the honeycomb core whereby the pressure differential between those cells partially evacuated and an exposed surface sheet material skin urges the sheet material skin into intimate engagement with the one surface of the honeycomb core and transporting the honeycomb core and the sheet material skin along a common linear predetermined path of travel during the evacuating of the cells and the securing of the skin to the core for providing a continuous honeycomb core having sheet material skin applied thereto.

3. A method of applying skins to honeycomb cores comprising the steps of providing a honeycomb core composed of a plurality of cells having exposed edge portions, adhesively securing a sheet material skin to at least one surface of the honeycomb core in overlying relationship to the exposed edge portions of the cells, pneumatically urging the sheet material skin into intimate engagement with the one surface of the honeycomb core and transporting the honeycomb core and the sheet material skin along a common linear predetermined path of travel during the urging and securing operations for providing a continuous honeycomb core having sheet material skin applied thereto.

4. A method of laminating skins to honeycomb cores comprising the steps of providing a honeycomb core composed of a plurality of cells having exposed edge portions, partially evacuating at least some of the cells, securing a sheet material skin to at least one surface of the honeycomb core in overlying relationship to the exposed edge portions of the cells, pneumatically urging the sheet material skin against the one surface of the honeycomb core whereby a pressure differential is established between those cells partially evacuated and the sheet material skin to secure the sheet material skin in intimate engagement with the one surface of the honeycomb core and transporting the honeycomb core and sheet material skin along a common linear predetermined path of travel during the urging and securing operations for providing a continuous honeycomb core having sheet material skin applied thereto.

5. A method of laminating skins to honeycomb cores comprising the steps of providing a honeycomb core composed of a plurality of cells having oppositely exposed edge portions defining first and second surface portions, adhesively securing a first sheet material skin to the first surface portion of the honeycomb core and a second sheet material skin to the second surface portion of the honeycomb core, simultaneously creating a pressure differential between at least some of the plurality of cells and the exterior surfaces of both sheet material skins thereby urging each of the sheet material skins into intimate contact with respective surface portions of the honeycomb core and transporting the honeycomb core and the sheet material skins along a common linear predetermined path of travel during the urging and securing operations for providing a continuous honeycomb core having sheet material skin applied thereto.

6. The method of laminating skins to honeycomb cores as defined in claim 5 including the step of supporting the honeycomb core by one of the sheet material skins during the transporting thereof along the predetermined path.

7. The method of laminating skins to honeycomb cores as defined in claim 5 including the step of tensioning at least one of the sheet material skins during the securing thereof to the honeycomb core.

8. The method of laminating skins to honeycomb cores as defined in claim 5 wherein the honeycomb core is transported by drawing the sheet material skins along the predetermined path and supporting at least one of the sheet material skins solely at points spaced longitudinally along said predetermined path.

9. The method of laminating skins to honeycomb cores as defined in claim 7 wherein the honeycomb core is transported by drawing the sheet material skins along the predetermined path and supporting at least one of the sheet material skins solely at points spaced longitudinally along said predetermined path.

10. A method of forming honeycomb blocks comprising the steps of providing a honeycomb core composed of a plurality of cells having oppositely exposed edge portions defining first and second surface portions, adhesively securing a first sheet material skin to the first surface portion of the honeycomb core and a second sheet material skin to the second surface portion of the honeycomb core, simultaneously creating a pressure differential between at least some of the plurality of cells and the exterior surfaces of both sheet material skins thereby urging each of the sheet material skins into intimate contact with respective surface portions of the honeycomb core, transporting the honeycomb core along a predetermined path by drawing the sheet material skins under tension and severing the honeycomb core and sheet material skins transversely of the predetermined path.

11. A method of forming honeycomb blocks comprising the steps of transporting a honeycomb core along a predetermined substantially linear path of travel through a chamber, transporting sheet material facings along predetermined paths in a first direction opposite to the path of travel of the honeycomb core in spaced relation to opposite surface portions of the honeycomb core, thereafter transporting the sheet material facings along paths in a second direction reversed to the first direction, applying the facings to the opposite surface portions of the honeycomb core during travel in the second direction, applying adhesive to the honeycomb core prior to the application of the facings thereto, creating a pressure differential between the honeycomb core and exposed surfaces of the facings by heating the honeycomb core to a temperature in excess of the temperature of the chamber and permitting the honeycomb core to cool during its transport through the chamber, and tensioning the facings during the movement thereof in the second direction.

12. A method of laminating skins to honeycomb cores comprising the steps of conveying a honeycomb core composed of a plurality of cells having exposed edge portions along a predetermined path at a predetermined speed, conveying a sheet material facing along said predetermined path at a substantially identical speed, applying adhesive to the exposed edge portions of the cells during the movement of the honeycomb core along the predetermined path and employing negative pressure for urging the sheet material facing into contact with the adhesively coated edge portions during the movement of the facing and the honeycomb core along the predetermined path in the absence of relative movement between the honeycomb core and the facing.

13. A method of applying skins to honeycomb cores comprising the steps of transporting a honeycomb core along a predetermined substantially linear path of travel through a chamber, transporting sheet material facings along predetermined paths in a first direction opposite to the path of travel of the honeycomb core in spaced relation to opposite surface portions of the honeycomb core, thereafter transporting the sheet material facings along paths in a second direction reverse to the first direction, applying the facings to the opposite surface portions of the honeycomb core during travel in the second direction and creating a pressure differential between the honeycomb core and exposed surfaces of the facings.

14. Apparatus for laminating skins to honeycomb cores comprising means for supporting a honeycomb core interposed between opposed sheet material skins at at least two longitudinally spaced points, means between said spaced points forming a pressure chamber for applying a pressurized fluid medium directly against exposed surfaces of the opposed skins thereby urging said skins into intimate engagement with the honeycomb core, and means beyond one of said spaced points for conveying the skins between said spaced points thereby forming the sole means for conveying said honeycomb core and sheets through said pressure chamber.

15. Apparatus for laminating skins to honeycomb cores comprising means for supporting a honeycomb core interposed between opposed sheet material skins at at least two longitudinally spaced points, means between said spaced points forming a pressure chamber for applying a pressurized fluid medium directly against exposed surfaces of the opposed skins thereby urging said skins into intimate engagement with the honeycomb core, means beyond one of said spaced points for conveying the skins between said spaced points thereby forming the sole means for conveying said honeycomb core and sheets through said pressure chamber, and means for tensioning said skins as the same are being conveyed between said spaced points thereby assuring intimate engagement between the skins and the honeycomb core.

16. Apparatus for laminating skins to honeycomb cores comprising means for supporting a honeycomb core interposed between opposed sheet material skins at at least two longitudinally spaced points, means between said spaced points forming a pressure chamber for applying a pressurized fluid medium directly against exposed surfaces of the opposed skins thereby urging said skins into intimate engagement with the honeycomb core, means beyond one of said spaced points for conveying the skins between said spaced points thereby forming the sole means for conveying said honeycomb core and sheets through said pressure chamber, and means for creating a pressure differential between the interior of the honeycomb core and exposed surfaces of the skins thereby assuring intimate engagement between the skins and the honeycomb core.

17. Apparatus for laminating skins to honeycomb cores comprising means for supporting a honeycomb core interposed between opposed sheet material skins at at least two longitudinally spaced points, means between said spaced points forming a pressure chamber for applying a pressurized fluid medium directly against exposed surfaces of the opposed skins thereby urging said skins into intimate engagement with the honeycomb core, means beyond one of said spaced points for conveying the skins between said spaced points thereby forming the sole means for conveying said honeycomb core and sheets through said pressure chamber, means for tensioning said skins as the same are being conveyed between said spaced points and means for creating a pressure differential between the interior of the honeycomb core and exposed surfaces of the skins whereby intimate engagement between the skins and the honeycomb is assured.

18. Apparatus for applying skins in intimate engagement with honeycomb cores comprising a chamber, means establishing a preselected temperature in said chamber, means for applying sheet material skins to opposed surface portions of a honeycomb core, means for heating selected portions of the honeycomb core beyond said preselected temperature substantially simultaneously with the application of the skins thereto, and means for conveying said skins and honeycomb core through said chamber whereby selective cooling of said selected portions creates a pressure differential between the selected portions and the chamber.

19. The apparatus as defined in claim 18 including a pressurized chamber within said chamber through which said skins and honeycomb core are conveyed.

20. The apparatus as defined in claim 19 including means outside said pressurized chamber for tensioning said skins as the same are conveyed through said pressurized chamber.

21. Apparatus for forming a honeycomb sheet comprising a first chamber, means establishing a preselected temperature in said chamber, an entrance wall and an exit wall forming portions of said first chamber, a first opening in said entrance wall through which a honeycomb core can be introduced into said first chamber, a second opening in said exit wall through which a honeycomb sheet can be withdrawn from said first chamber, a pair of openings in said exit through which sheet material skins can be introduced into said first chamber, a pair of rotatable rolls in said first chamber adjacent said entrance wall, a roll of said pair of rolls being positioned on opposite sides of the first opening, each opening of said pair of openings being positioned on opposite sides of said second opening whereby sheet material skins introduced through the openings and entrained about the pair of rolls are withdrawn through the second opening with the honeycomb core interposed therebetween, a second chamber in said first chamber, means for introducing fluid under pressure into said second chamber, said second chamber having first and second openings adjacent the first and second openings in the respective entrance and exit walls of the first chamber, the pair of rolls being positioned between said first openings whereby the sheet material skins entrained about the pair of rolls are introduced into said second chamber, gasket means in said second chamber adapted to contact the skins and prevent the escape of pressurized fluid from said second chamber, means in said first chamber for directing a fluid medium at a temperature in excess of the preselected temperature of said first chamber toward said pair of rolls, means located outside of said first chamber adjacent said entrance wall for applying adhesive to a honeycomb core introduced into said first chamber, and means located outside of said first chamber adjacent said exit wall for tensioning and withdrawing the skins from said first chamber.

22. Apparatus for laminating skins to honeycomb cores comprising means for supporting a honeycomb core interposed between opposed sheet material skins at at least two longitudinally spaced points, means between said spaced points for creating a pressure differential between the interior of the honeycomb core and exposed surfaces of the skins thereby assuring intimate engagement between the skins and the honeycomb core, and means for conveying the skins and the honeycomb core interposed therebetween between said spaced points.

References Cited

UNITED STATES PATENTS

| | | | |
|---|---|---|---|
| 2,236,056 | 3/1941 | Grimm | 156—205 |
| 2,731,379 | 1/1956 | Wheeler | 156—197 |
| 3,175,300 | 3/1965 | Nitchie | 156—60 XR |

(Other references on following page)

UNITED STATES PATENTS

| | | | |
|---|---|---|---|
| 3,257,253 | 6/1966 | Hoyt | 156—197 XR |
| 891,428 | 6/1908 | Latus | 156—80 |
| 2,700,632 | 1/1955 | Ackerlind | 156—285 XR |
| 2,790,207 | 4/1957 | Steele et al. | 156—197 |
| 2,978,806 | 4/1961 | Herbert | 156—286 |
| 3,067,507 | 12/1962 | Titus | 156—286 |
| 3,097,982 | 7/1963 | Stoner | 156—211 |
| 3,066,722 | 12/1962 | Adams et al. | 156—197 |

HAROLD ANSHER, Primary Examiner

H. F. EPSTEIN, Assistant Examiner

U.S. Cl. X.R.

156—382, 548